WANSBROUGH & DIGGINS.
Seed Planter.
No. 44,357. Patented Sept. 20, 1864.
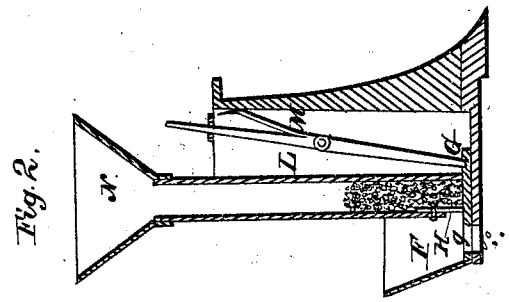
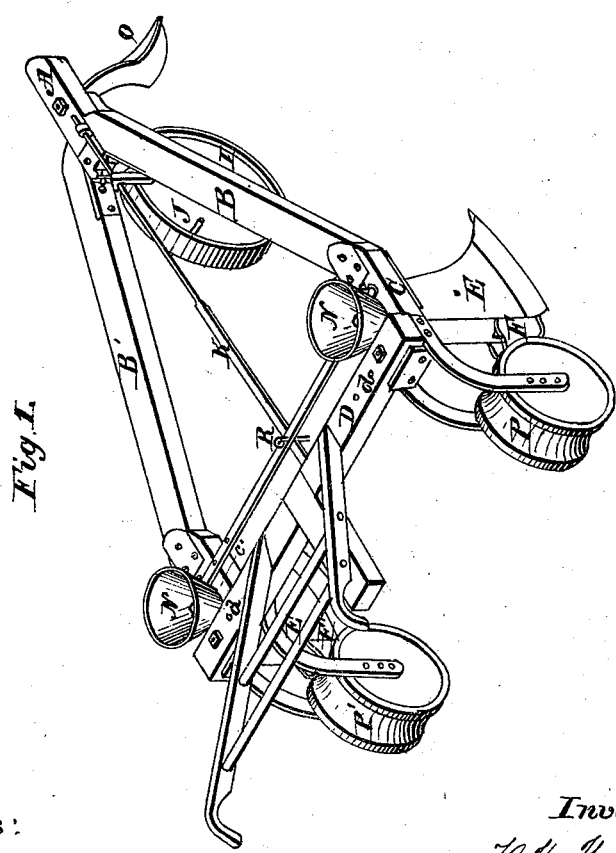
Witnesses:
James H. Layman.
W. H. Mackoy
Inventors:
H. W. Wansbrough
H. M. Diggins
pr Knight Bros.
attys.

UNITED STATES PATENT OFFICE.

HENRY W. WANSBROUGH AND HENRY M. DIGGINS, OF CINCINNATI, OHIO.

CORN-PLANTER.

Specification forming part of Letters Patent No. 44,357, dated September 20, 1864.

*To all whom it may concern:*

Be it known that we, HENRY W. WANSBROUGH and HENRY M. DIGGINS, both of Cincinnati, county of Hamilton, and State of Ohio, have invented a certain new and useful Improvement in Corn-Planters; and we do hereby declare the following to be a full, true, and exact description, reference being had to the accompanying drawings, making part of this specification.

Our invention relates to an automatic implement, drawn by animal-power, for the planting of corn or other large grain in hills or drills.

Figure 1 is a perspective view of a machine embodying our invention. Fig. 2 is a vertical section through the seeding mechanism proper.

A is a tongue, to which the team is hitched.

B B' are two beams, which are hinged to the tongue A at their front ends and at their rear ends to brackets C C', which brackets are rigidly attached to a cross-beam, D. A series of apertures, *d*, in the cross-beam enable the brackets C C' and the rear ends of the beams B B' to be set nearer to or farther from each other for narrower or wider planting. Depending rigidly from each bracket is a hollow drill-tooth, E, open at the top and also at its lower rear part, where it discharges into a short guard, F.

G is a seed-measuring valve or slide, having a perforation, *g*, of suitable size to receive three or more grains of corn, as may be desired.

H is a cut-off, of india-rubber.

Journaled beneath the front part of the frame is a ground-wheel, I, having one or more studs, J, which at every revolution of said wheel draw forward a rod, K, which in turn operates a lever, L, which forces the slide G, with its charge of corn, into the guard F, whence it descends into the furrow just opened by the drill-tooth E. These motions having been effected, the slide G is drawn back into the hollow tooth E by means of a spring, M.

N is the hopper, by means of which the corn is fed to the drill-tooth.

A share, O, affixed immediately in front of the ground-wheel I, serves to prepare a level track therefor.

Rollers P P' act to cover the corn and to press the ground snugly about it.

A pin, R, is to be drawn out so as to disengage the machinery when the planter is being turned around.

It will be perceived that each charge of corn can be easily observed by the operator as it enters the guard F, and consequently he is enabled to inform himself at any time whether the apparatus is in successful operation It will also be perceived that every quantum of grain is discharged just above the very spot where it is to be planted, resulting in greater accuracy than in the customary planters, whose seed-discharging mechanism operates at some distance from the ground.

Useful novelty is claimed in that the slide G serves the twofold purpose of measuring the grain and dropping the same near the surface of the ground, thus dispensing with a special measuring slide or valve in the hopper.

We have described a cut-off made of india-rubber, deeming that the best material, but do not desire to restrict the invention to such, as other yielding or elastic substances—such as leather or bristles—may be employed with very good effect.

We claim—

1. The combination of the hollow drill-tooth E, guard F, hopper N, and slide G, operating substantially as herein set forth.

2. The provision of the yielding cut-off H, applied and operating as set forth.

3. The arrangement of ground-wheel I, rod K, lever L, spring M, and cut-off H, in the described combination, with the grain-slide G near the bottom of a hollow drill-tooth, substantially as set forth.

In testimony of which invention we hereunto set our hands.

H. W. WANSBROUGH.
      H. M. DIGGINS.

Witnesses:
 GEO. H. KNIGHT,
 JAMES H. LAYMAN.